United States Patent
Kamel et al.

(10) Patent No.: US 8,265,552 B2
(45) Date of Patent: Sep. 11, 2012

(54) BEAM SELECTION IN A MULTIPLE BEAM ANTENNA IN A FIXED WIRELESS CPE

(75) Inventors: Raafat Edward Kamel, Little Falls, NJ (US); Kamlesh Kamdar, Dublin, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 12/872,677

(22) Filed: Aug. 31, 2010

(65) Prior Publication Data

US 2012/0052828 A1 Mar. 1, 2012

(51) Int. Cl.
*H04B 7/14* (2006.01)
*H04K 3/00* (2006.01)

(52) U.S. Cl. ........................ 455/25; 455/562.1
(58) Field of Classification Search ............ 455/3.01, 455/25, 101, 226.1–226.2, 277.1–277.2, 455/562.1
See application file for complete search history.

(56) References Cited

U.S. PATENT DOCUMENTS

| | | | | |
|---|---|---|---|---|
| 5,471,671 A | * | 11/1995 | Wang et al. | 455/226.2 |
| 5,952,966 A | * | 9/1999 | Smith | 342/373 |
| 2005/0179607 A1 | | 8/2005 | Gorsuch et al. | |
| 2007/0173303 A1 | | 7/2007 | Viorel et al. | |
| 2008/0030400 A1 | * | 2/2008 | Lee | 342/155 |
| 2010/0311321 A1 | | 12/2010 | Norin | |
| 2010/0313232 A1 | | 12/2010 | Norin | |

* cited by examiner

*Primary Examiner* — Lee Nguyen

(57) ABSTRACT

A method includes scanning beams of a multiple beam antenna to collect metrics associated with the beams; selecting a best beam based on the collected metrics or based on a manual selection received from an operator; retrieving thresholds associated with the metrics; comparing the collected metrics, associated with the selected best beam, to the retrieved thresholds; and determining whether the antenna unit is in an acceptable location based on the comparison. Another method includes scanning beams of the multiple beam antenna to collect metrics associated with the beams; selecting a best beam based on the collected metrics; determining a serving beam; comparing a set of metrics associated with the selected best beam with a corresponding set of metrics associated with the serving beam; and determining whether to switch from the serving beam to the selected best beam based on the comparison.

29 Claims, 9 Drawing Sheets

420 →

| CURRENT SERVING BEAM 501 | DELTA (HANDOVER) 502 | DELTA (NO HANDOVER) 503 |
|---|---|---|
| BEAM ID 510 | SINR 530 ||
| SERVING CELL 515 | RSRP 535 ||
|| PATH LOSS 540 ||
|| RSRQ 545 ||
|| SERVING CELL RSRP/ SUM OF DETECTED CELL(S) RSRP 550 ||
|| CHANNEL RANK AND CQI 555 ||
|| THROUGHPUT 560 ||
|| TRANSMIT POWER 565 ||

BEAM SELECTION IN A MULTIPLE BEAM ANTENNA IN A FIXED WIRELESS CPE

BACKGROUND INFORMATION

Bundled media services (e.g., combination packages of television, telephone, and broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remained unpopular.

As wireless network data rates improve using fourth generation (4G) technologies, such as Long-Term Evolution (LTE), such technologies have become more attractive for fixed wireless networks. However, CPE and installation costs have remained a barrier to successfully promoting bundled services over fixed wireless networks.

BRIEF DESCRIPTION OF THE DRAWINGS

FIG. 5 is a diagram of example fields that may be stored within an antenna table of the beam switching controller according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to aiding an operator to install an antenna unit with a multiple beam antenna in an acceptable location by determining whether one or more metrics associated with particular beams of the multiple beam antenna satisfy one or more thresholds. The antenna unit may include one or more indicators for informing the operator whether the unit is in an acceptable location. For example, the antenna unit may activate a first indicator if one or more metrics associated with particular beams of the multiple beam antenna are greater than a first set of thresholds, may activate a second indicator if the one or more metrics are not greater than the first set of thresholds but are greater than a second set of thresholds, and may activate a third indicator if the one or more metrics are not greater than the second set of thresholds. The antenna unit may include a manual installation option. A manual installation option may allow an operator to manually select a beam based on the one or more metrics, and/or may allow the operator to override a selection of a best beam (e.g., based on the operator's perception of the local environment).

Additionally, an implementation described herein may relate to selecting a beam of a multiple beam antenna during operation. An antenna unit may scan particular beams of the multiple beam antenna to determine one or more metrics associated with the particular beams. The metrics may include one or more of a a signal to interference plus noise ratio (SINR), a reference symbol received power (RSRP), a downlink (and/or uplink) path loss, a reference symbol received quality (RSRQ), a ratio of a serving cell RSRP to a sum of detected cells RSRP, a channel rank and/or a channel quality indicator (CQI), a throughput, and/or a transmit power. The antenna unit may select a best beam based on the determined metrics and, if the best beam is different from the current serving beam, may determine whether the metrics of the best beam are greater than the metrics of the serving beam by at least a constant. The constant may differ based on whether switching from the current serving beam to the best beam would result in a handover (e.g., a switching base stations).

Figure 1:
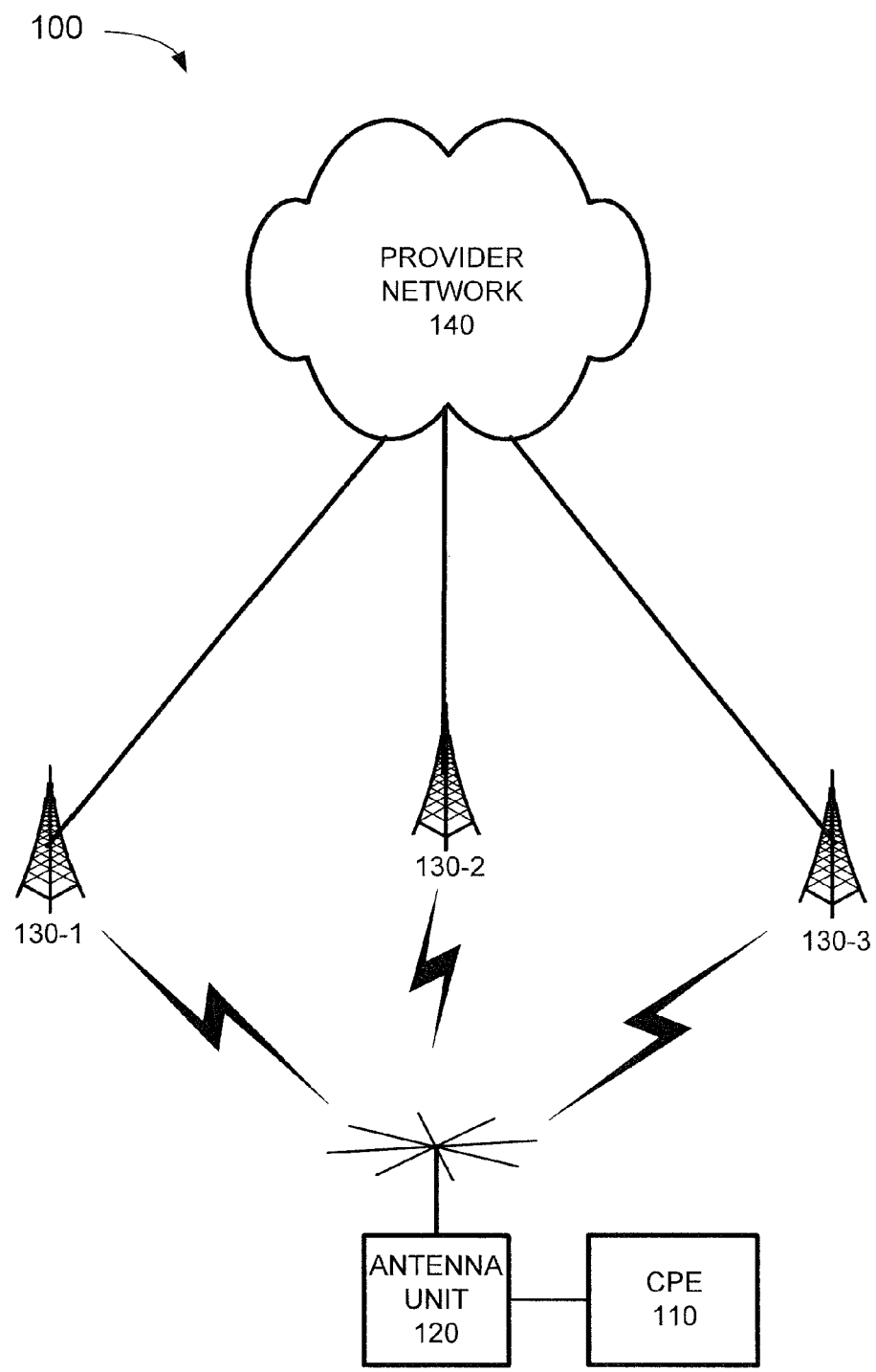
FIG. 1 is a diagram illustrating an example of components of a system according to an implementation described herein.

FIG. 1 is a diagram illustrating example components of system 100 according to an implementation described herein. As shown in FIG. 1, system 100 may include a CPE device 110, an antenna unit 120, one or more base stations 130-1 to 130-3 (referred to herein collectively as "base stations 130" or individually as "base station 130"), and a provider network 140.

CPE device 110 may include one or more devices that receive signals from provider network 140. For example, CPE device 110 may include a set-top box, a television, a computer, a network device (e.g., a router, a switch, or a gateway), a gaming console, a communication device (e.g., a telephone terminal), any combination thereof, or any other electronic device capable of receiving signals from provider network 140.

Antenna unit 120 may include a multiple beam antenna, a switch for selecting one or more beams of the multiple beam antenna, and a beam switching controller to control the switch. In a one implementation, antenna unit 120 and CPE device 110 may be part of the same device (e.g., encased in the same housing). In another implementation, antenna unit 120 and CPE device 110 may be separate devices, connected via a wired connection (e.g., coaxial cable) and/or a wireless connection (e.g., a Bluetooth connection).

Base stations 130 may include one or more devices and other components and functionality that allow CPE device 110 to wirelessly connect to provider network 140. One or more of base stations 130 may receive data signals, and/or real-time audio, voice or video signals from provider network 140 and transmit the received signals to antenna unit 120 via wireless signals. One or more of base stations 130 may receive wireless data signals, and/or real-time audio, voice or video signals from antenna unit 120 and transmit the received signals to provider network 140 via wireless signals. In one example implementation, base station 130 may include an eNodeB that utilizes LTE standards operating in a particular frequency band (e.g., a 700 MHz frequency band).

A particular base station 130 may be associated with one or more cells. Each cell associated with base station 130 may cover a particular geographic area and each cell may include one or more radio frequency (RF) transmitters and a corresponding antenna pointed in a particular direction. For example, in one implementation, base station 130 may include three cells, where each cell covers approximately 120 degrees of the area surrounding base station 130. In another implementation, cells of base station 130 may be geographically distributed and need not be adjacent one another.

Base stations 130 may transmit reference signals at particular intervals. The transmitted reference signals may include information such as a power at which the signal is transmitted, and/or reference symbols which may be used by a receiving device to compute metrics such as SINR, RSRP, path loss, RSRQ, and/or channel rank and channel quality indicators.

Provider network 140 may allow the delivery of Internet Protocol (IP) broadband services to CPE device 110, and may interface with other external networks. Provider network 140 may include one or more server devices and/or network devices, or other types of computation or communication devices. Provider network 140 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
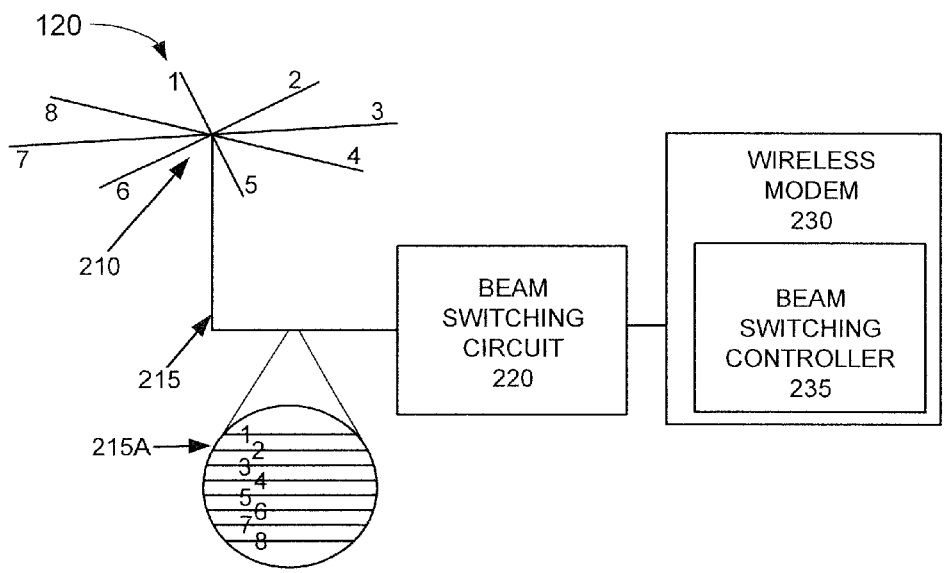
FIG. 2 is a diagram illustrating an example of components of a CPE device according to an implementation described herein.

FIG. 2 is a diagram illustrating example components of antenna unit 120 according to an implementation described herein. As shown in FIG. 2, antenna unit 120 may include a multiple beam antenna 210, an antenna wire assembly 215, a beam switching circuit 220, and a wireless modem 230.

Multiple beam antenna 210 may include multiple fixed passive antenna elements (e.g., beams). The antenna elements may be partially overlapping and may each be oriented to a different direction on an x-y plane (or a different plane), spanning a combined 360 degrees in azimuth. The antenna elements may be combined, via beam switching circuit 220, to synthesize narrower antenna elements. While FIG. 2 illustrates an antenna with eight beams (beams 1-8), multiple beam antenna 210 may include any number of beams. The number of beams may be determined based on the cost and complexity of multiple beam antenna 210 and beam switching circuit 220.

A particular beam of multiple beam antenna 120 may support two receive diversities realized using polarization diversity. The polarizations may be either horizontal and vertical or slant (+/−45 degrees) polarizations. Under the LTE standard, an eNodeB may use two or more transmitters, where the transmitters may use vertical polarizations (for all transmitters), slant polarizations, or a combination of various polarizations and/or space diversities (which may rely on vertical polarization). In one implementation, a particular beam may require only a single transmitter path for CPE device 110. In another implementation, a particular beam may require multiple transmitter paths (e.g., two transmitter paths) for CPE device 110.

Antenna wire assembly 215 may connect multiple beam antenna to beam switching circuit 220, and may include a separate connection for each element of multiple beam antenna 120 (see item 215A of FIG. 2). Beam switching circuit 220 may select a particular beam of multiple beam antenna 120. For example, beam switching circuit 220 may select one of beams 1-8. Beam switching circuit 220 may combine outputs from different beams of multiple beam antenna 120 to synthesize a new beam that points in a particular direction on the x-y plane in which beams of multiple beam antenna 120 are located.

Wireless modem 230 may include a RF receiver that receives signals from multiple beam antenna 120 and performs signal processing on the received signals before providing the received signals to CPE device 110, and a RF transmitter that receives signals to be transmitted wirelessly and performs signal processing on the signals before providing the signals to multiple beam antenna 120. For example, wireless modem 230 may perform one or more of analog-to-digital and digital-to-analog conversion, modulation and demodulation, up-conversion and down-conversion, and/or amplification of signals.

Wireless modem 230 may include a beam switching controller 235. Beam switching controller 235 may scan particular beams of multiple beam antenna 120 by controlling beam switching circuit 220 to select a particular beam. Beam switching controller 235 may collect one or more metrics associated with the particular beam based on signals received via the particular beam. Based on metrics collected for the beams of multiple beam antenna 120, beam switching controller 235 may select a best beam. During installation, beam switching controller 235 may determine whether metrics associated with the best beam are greater than a first set of thresholds and/or greater than a second set of thresholds, and may activate a particular indicator based on the determination. During operation, beam switching controller 235 may determine whether beams of multiple beam antenna 120 may be scanned, may collect one or more metrics associated with a particular beam based on signals received via the particular beam, may select a best beam, and may determine whether to switch a current serving beam to the selected best beam.

Although FIG. 2 shows example components of antenna unit 120, in other implementations, antenna unit 120 may include fewer components, different components, differently arranged components, or additional components than depicted in FIG. 2. Additionally or alternatively, one or more components of antenna unit 120 may perform the tasks described as being performed by one or more other components of antenna unit 120.

Figure 3:
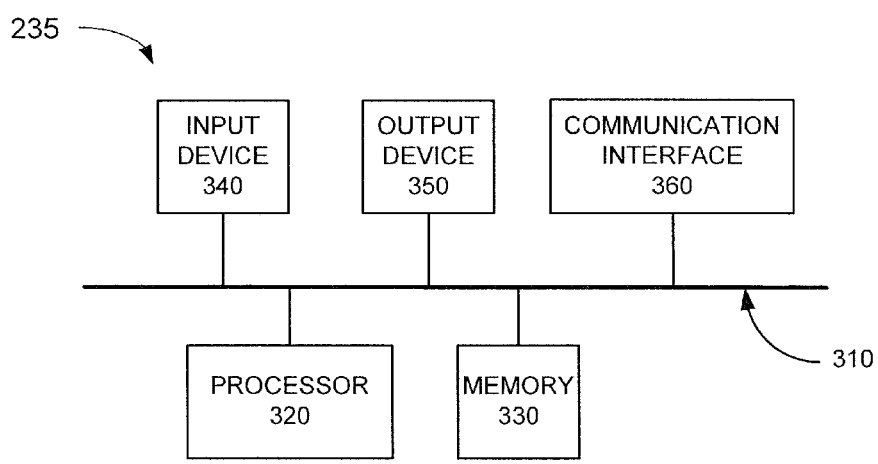
FIG. 3 is a diagram illustrating an example of components of a beam switching controller depicted in FIG. 2.

FIG. 3 is a diagram illustrating example components of beam switching controller 235. As shown, beam switching controller 235 may include a bus 310, a processor 320, a memory 330, an input device 340, an output device 350, and a communication interface 360.

Bus 310 may include a path that permits communication among the components of beam switching controller 235. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to beam switching controller 235, such as a keypad, a button, a pen, a touch screen, voice recognition and/or biometric mechanisms, etc. Output device 350 may include a mechanism that outputs information to the operator, including a display, one or more light emitting diodes (LEDs), a speaker, etc. For example, in one implementation, output device 350 may include a green LED, a yellow (or amber) LED, and/or a red LED that may be used by an operator during installation of antenna unit 120. In another implementation, output device 350 may include a different number, colors, arrangement, and/or combination of LEDs. Alternately or additionally, output device 350 may include a different type of output device, such as a screen with a multipixel array, and/or a speaker that provides audible information to an operator during installation.

Communication interface 360 may include any transceiver-like mechanism that enables beam switching controller 235 to communicate with other devices and/or systems, such as for communicating with base stations 130, or with provider network 140 via base stations 130. For example, communication interface 360 may include a modem, a network interface card, or a wireless interface card.

As will be described in detail below, beam switching controller 235 may perform certain operations. Beam switching controller 235 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of beam switching controller 235, in other implementations, beam switching controller 235 may contain fewer components, different components, additional components, or differently arranged components than depicted in FIG. 3. Additionally or alternatively, one or more components of beam switching controller 235 may perform one or more tasks described as being performed by one or more other components of beam switching controller 235.

Figure 4:
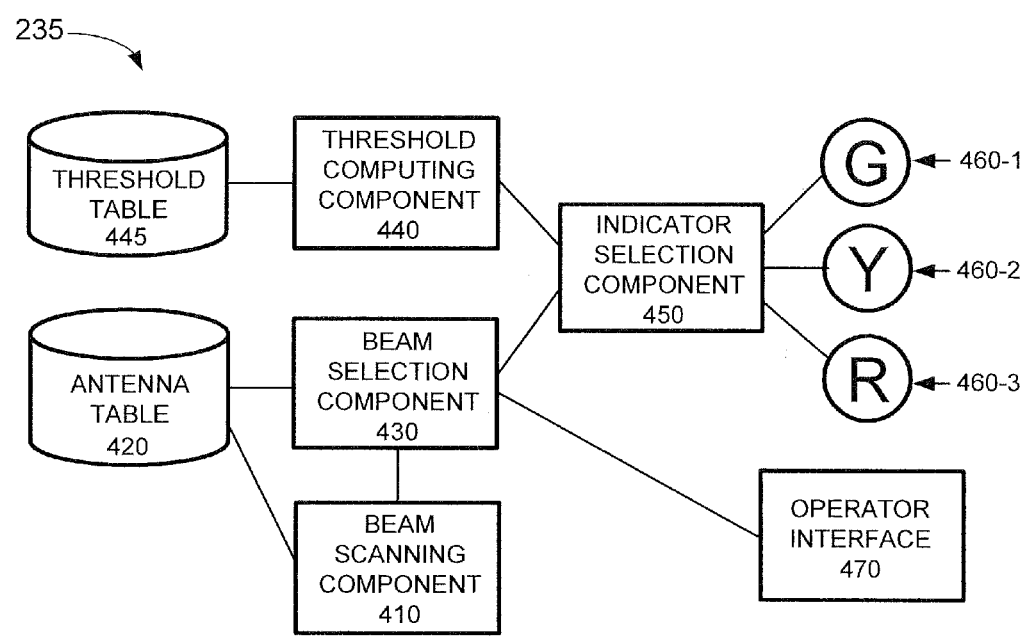
FIG. 4 is a diagram illustrating an example of functional components of the beam switching controller depicted in FIG. 2.

FIG. 4 is a diagram illustrating example functional components of beam switching controller 235 according to an implementation described herein. In one example, one or more of the functions described in connection with FIG. 4 may be performed by one or more of the components depicted in FIG. 3. As shown in FIG. 4, beam switching controller 235 may include a beam scanning component 410, an antenna table 420, a beam selection component 430, a threshold computing component 440, a threshold table 445, an indicator selection component 450, one or more indicators 460-1 to 460-3 (referred to herein collectively as "indicators 460" or individually as "indicator 460"), and an operator interface 470.

Beam scanning component 410 may schedule scanning of beams of multiple beam antenna 120, may select a particular beam to scan, and may indicate to beam selection component 430 which beam to select during a scan. Beam scanning component 410 may monitor multiple beam antenna 210 to determine whether there is a radio connection between CPE device 110 and base station 130. If there is no radio connection, CPE device 110 may be in an idle mode, and beam scanning component 410 may schedule beam scans in radio frames that do not coincide with paging frames. If a radio connection exists between CPE device 110 and base station 130, beam scanning component 410 may schedule beam scans in radio frames that coincide with times when CPE device 110 is not scheduled to receive data on the data channel.

Antenna table 420 may store metrics collected by beam scanning component 410 for particular beams of multiple beam antenna 210. Example fields that may be stored in antenna table 420 are described below with reference to FIG. 5.

Beam selection component 430 may select a particular beam of multiple beam antenna 210 in response to a request from beam scanning component 410 to scan the particular beam. Beam selection component 430 may retrieve metrics, associated with particular beams, stored in antenna table 420, and may select a best beam based on one or more of the retrieved metrics. For example, beam selection component 430 may compute a beam score for particular beams based on the retrieved metrics and may select a best beam based on the computed beam scores.

Threshold computing component 440 may compute thresholds for particular metrics associated with beams of multiple beam antenna 210. Threshold computing component 440 may compute the thresholds based on various parameters, such as marketing requirements (e.g., a bit rate guaranteed to the customer using CPE device 110) or requirements associated with particular applications of CPE device 110 (e.g., a required video streaming rate). Threshold computing component 440 may store the computed thresholds in threshold table 445.

Threshold table 445 may store one or more sets of thresholds for particular metrics associated with beams of multiple beam antenna 210. For example, threshold table 445 may store a first set of thresholds {TG1, . . . TGN} that may be used to determine whether to activate a first indicator (e.g., a green LED) and a second set of thresholds {TY1, . . . TYN} that may be used to determine whether to activate a second indicator (e.g., a yellow LED).

Additionally, threshold table 445 may store one or more trigger thresholds for particular metrics associated with beams of multiple beam antenna 210. The trigger thresholds may be used to initiate beam scans. For example, beam scanning component 410 may monitor a SINR of a currently serving beam and may trigger a beam scan if the SINR falls below a trigger threshold associated with the SINR. In one implementation, the trigger thresholds may correspond to the first set of thresholds or to the second set of thresholds. In another implementation, the trigger thresholds may differ from the first set of thresholds and the second set of thresholds.

Indicator selection component 450 may activate an indicator based on information received from beam selection component 430 and based on information received from threshold computing component 440. For example, indicator selection component 450 may compare particular metrics associated with a best beam selected by beam selection component 430 with thresholds associated with the particular metrics.

Indicators 460 may include one or more indicators for informing an operator, during installation of antenna unit 120, of whether antenna unit 120 is in an acceptable location. In one implementation, indicators 460 may include LEDs. In another implementation, indicators 460 may include another type of visual indicator, audible indicator, or a combination of a visual indicator and an audible indicator. For example, as shown in FIG. 4, in one implementation, indicators 460 may include a green LED indicator 460-1, a yellow LED indicator 460-2, and a red LED indicator 460-3. Green LED indicator 460-1 may be activated when antenna unit 120 is in a good location, informing an operator that the operator can complete the installation. Yellow LED indicator 460-2 may be activated when antenna unit 120 is in an acceptable but not optimal location, indicating to the operator that the operator should try another location if possible. Red LED indicator 460-3 may be activated when antenna unit 120 is in a location that is not acceptable, indicating that location cannot provide service to CPE device 110. In another implementation, indicators 460 may include a different set of illuminable indicators, such as an illuminable "GOOD" sign indicator, an illuminable "OK" sign indicator, and an illuminable "BAD" indicator. In yet another implementation, indicators 460 may control different states of a single physical device, such as a multi-color LED (or another type of multi-color display device), or a display device capable of displaying at least three different states.

Operator interface 470 may include a display that allows an operator to view metrics associated with a particular beam, and may include an input device for manual selection of a beam. Operator interface 470 may allow an operator to manually select a particular beam as the operating beam of antenna unit 120. An operator may manually select a beam based on beam metrics computed by beam selection component 430 and displayed by operator interface 470. Additionally or alternatively, an operator may manually select a beam based on local conditions perceived by the operator (e.g., local traffic conditions, a unique feature of the environment, and/or another unique condition justifying manual beam selection). In another implementation, operator interface 470 and indicators 460 may be integrated into the same display component.

Although FIG. 4 shows example functional components of beam switching controller 235, in other implementations, beam switching controller 235 may contain fewer functional components, different functional components, differently arranged functional components, or additional functional components than depicted in FIG. 4. Additionally or alternatively, one or more functional components of beam switching controller 235 may perform one or more other tasks described as being performed by one or more other functional components of beam switching controller 235.

FIG. 5 is a diagram of example fields that may be stored within antenna table 420 according to an implementation described herein. In one implementation, antenna table 420 may be implemented in a storage device included as part of memory 330 of beam switching controller 235. In another implementation, antenna table 420 may be stored in a memory associated with another device or a group of devices, separate from or including memory 330 of beam switching controller 235. As shown in FIG. 5, antenna table 420 may include one or more beam records 500 (referred to herein collectively as "beam records 500" or individually as "beam record 500"), a current serving beam field 501, a delta handover (delta$_{handover}$) field 502, and a delta no handover (delta$_{no\text{-}handover}$) field 503.

Current serving beam field 501 may store information identifying a particular beam of multiple beam antenna 210 that is currently being used by CPE device 110 to communicate with base station 130. Delta$_{handover}$ field 502 may store a constant that may be used to determine whether to switch from a current serving beam to a newly selected best beam when the switch would result in a handover from a first base station to a second base station. Delta$_{no\text{-}handover}$ field 503 may store a constant that may be used to determine whether to switch from a current serving beam to a newly selected best beam when the switch would not result in a handover (e.g., the current serving beam and the newly selected best beam are associated with the same base station). In one implementation, delta$_{handover}$ field 502 and delta$_{no\text{-}handover}$ field may be used to compare beam scores of a serving beam and a selected best beam. In another implementation, delta$_{handover}$ field 502 and delta$_{no\text{-}handover}$ field 503 may include multiple values for different metrics, and may be used to compare particular metrics of a serving beam and a selected best beam.

Beam record 500 may store information associated with a particular beam of multiple beam antenna 210. Beam record 500 may include a beam identification (ID) field 510, a serving cell field 515, and a beam metrics field 520.

Beam ID field 510 may identify a particular beam. Serving cell field 515 may store information identifying one or more serving cells associated with the particular beam. For example, serving cell field 515 may store information identifying particular base stations, and/or cells associated with the particular base stations, from which the particular beam receives signals. If the particular beam is able to receive signals from more than one base station, and/or cells, serving cell field 515 may store information identifying a preferred base station and/or serving cell, such as the base station and/or serving cell associated with the strongest signal.

Beam metrics field 520 may store information about metrics associated with the particular beam identified in beam ID field 510. Beam metrics field 520 may include a SINR field 530, a RSRP field 535, a path loss field 540, a RSRQ field 545, a serving cell RSRP/sum of detected cells RSRP field 550, a channel rank and CQI field 555, a throughput field 560, and a transmit power field 565.

SINR field 530 may store a SINR value associated with the particular beam. SINR may indicate a ratio of signal power to interference plus noise power corrupting the signal. The SINR value may be measured from signals received by a particular cell of a particular base station, called the serving cell of the particular beam. If the particular beam is able to receive signals from more than one cell, a particular cell may be selected as the serving cell. For example, a cell associated with signals received at the highest signal strength may be designated as the serving cell of the particular beam. Alternatively or additionally, SINR field 530 may store a signal to noise ratio (SNR) and/or a signal to noise plus distortion ratio (SNDR) associated with the particular beam.

RSRP field 535 may store a RSRP value associated with the particular beam. The RSRP value may relate to signal strength of signals received from the serving cell and may be defined as a linear average the received power of resource elements that carry cell-specific reference symbols within a particular frequency bandwidth. The RSRP value may be computed by beam switching controller 235 based on reference symbols received from base station 130.

Path loss field 540 may store a downlink (or uplink) path loss value associated with the particular beam. A RF transmitter associated with a cell of base station 130 may transmit information about the power at which the RF transmitter is transmitting. Beam switching controller 235 may measure a power at which the signal is received and compare the received power to the transmitted power to determine downlink path loss. Beam switching controller 235 (or another component of antenna unit 120) may transmit information about the power at which antenna unit 120 is transmitting. Base station 130 may measure a power at which the signal is received from antenna unit 120 and compare the received power to the transmitted power to determine uplink path loss. Base station 130 may transmit information about uplink path loss to antenna unit 120.

RSRQ field 545 may store a RSRQ value associated with the particular beam. The RSRQ value may relate to signal quality and may be defined as a ratio of RSRP to a carrier received signal strength indicator (RSSI). The carrier RSSI may be defined as a linear average of a total received power in orthogonal frequency division multiplexing (OFDM) symbols containing the reference symbols. The RSRQ value may be computed by beam switching controller 235 based on reference symbols received from base station 130.

Serving cell RSRP/sum of detected cells RSRP field 550 may store a value corresponding to a ratio of a serving cell RSRP to a sum of detected cells RSRP associated with the particular beam. A particular beam may detect signals from more than one cell. The cells from which the particular beam is able to receive signals may be associated with a same base station or with different base stations. Beam switching controller 235 may select one of the cells as the serving cell (e.g., based on measured received power), may calculate RSRP for all the detected cells, and may calculate a ration of the serving cell RSRP to the sum of RSRP values for all the detected cells.

Channel rank and CQI field 555 may store one or more values corresponding to channel rank and/or a channel quality indicator associated with the particular beam. A channel rank may correspond to a correlation between two channels transmitted by the serving cell of the particular beam, and may represent how independent the two channels are (e.g., may represent the orthogonality of the channels). Channel rank may be computed as the rank of the correlation matrix of the two channels. CQI may correspond to a measure of channel quality, and may be based on a SINR of the channel, a SNR of the channel, and/or a SNDR of the channel.

Throughput field 560 may store a throughput value associated with the particular beam. The throughput value may correspond to an average rate of successful downlink (or uplink) message delivery between the serving cell and the particular beam. Throughput may be measured in bits per second, packets per second, and/or packets per time slot. Additionally, throughput field 560 may store a value corresponding to a packet loss rate associated with the particular beam.

Transmit power field 565 may store a transmit power associated with the particular beam. The transmit power of the particular beam may be based on signals received from base station 130. For example, base station 130 may measure the power (and/or noise level) of signals received from antenna unit 120 and may instruct antenna unit 120 to increase the transmit power.

Although FIG. 5 shows example fields of antenna table 420, in other implementations, antenna table 420 may contain fewer fields, different fields, additional fields, or differently arranged fields than depicted in FIG. 5. Additionally or alternatively, one or more fields of antenna table 420 may include information described as being included in one or more other fields of antenna table 420.

Figure 6:
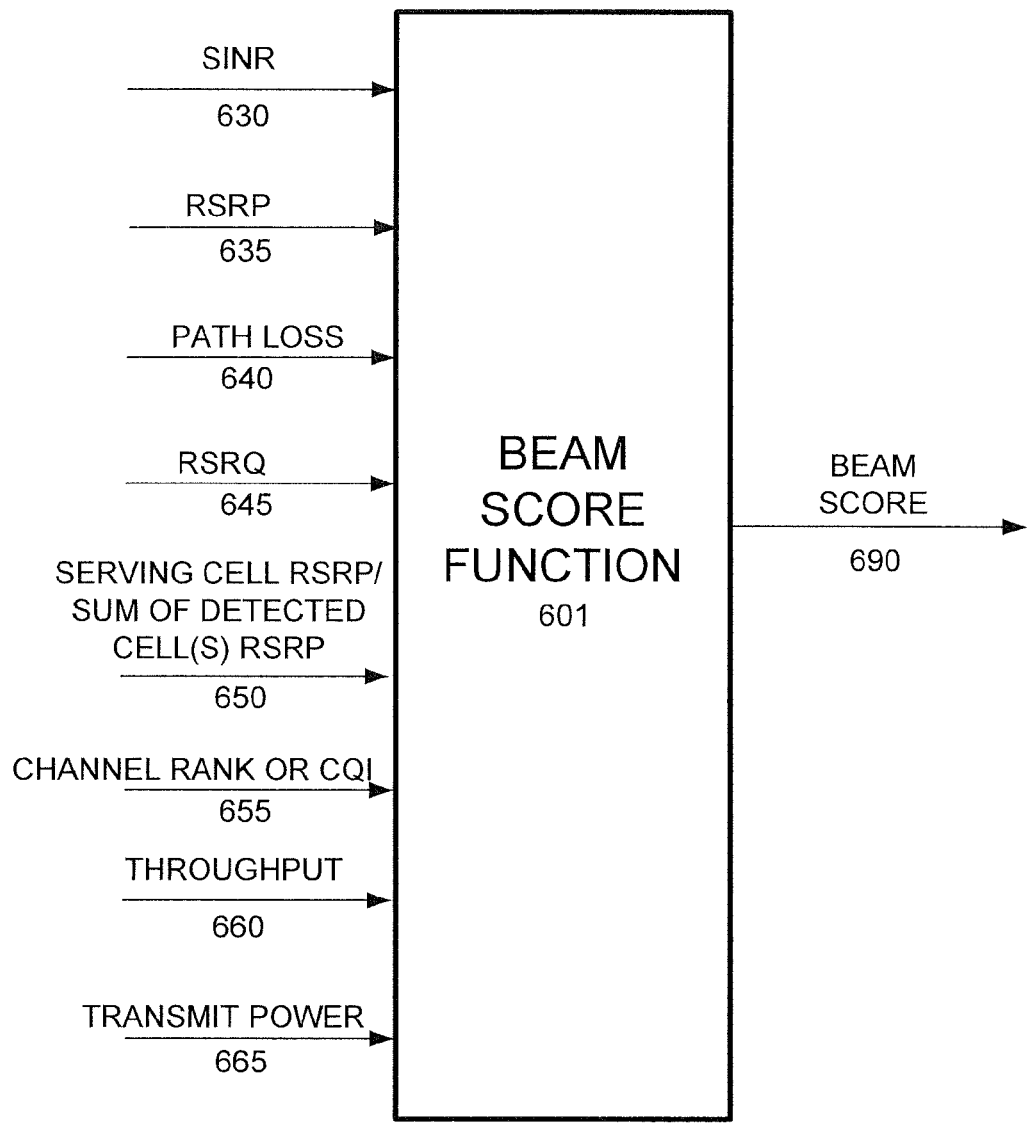
FIG. 6 is a diagram of an example of a beam score function according to an example implementation.

FIG. 6 is a diagram of an example beam score function 601 that may be implemented by beam selection component 430 according to an example implementation. Beam score function 601 may, for a particular beam, take, as input values, one or more of the depicted metrics and generate a beam score 690. The input values may be normalized. For example, values from fields 530 to 565 may be normalized to a scale from 0 to 1 prior to being used as inputs for beam score function 601. Beam score function 601 need not use all the inputs depicted in FIG. 6. Beam score 690 may be used by beam selection component 430 to select a best beam of multiple beam antenna 120.

Beam score function 601 may include a SINR input 630. SINR input 630 may be based on SINR field 530. A high SINR value may increase beam score 690. Providing an input based on the SINR of signals received by the beam may be used to influence beam score 690 so that a beam with a higher SINR, which may indicate a higher quality of signals, is more likely to be selected as the best beam of multiple beam antenna 120.

Beam score function 601 may include a RSRP input 635. RSRP input 620 may be based on RSRP field 535. A high RSRP value may increase beam score 690. Providing an input based on the RSRP associated with a serving cell of a beam may be used to influence beam score 690 so that a beam that receives signals with a higher power is more likely to be selected as the best beam of multiple beam antenna 120. A higher signal power may indicate that more packets are received without having to be re-transmitted.

Beam score function 601 may include a path loss input 640. Path loss input 640 may be based on path loss field 540. A high path loss may decrease beam score 690. Providing an input based on path loss of signals received by a beam may be used to influence beam score 690 so that a beam with a low path loss is more likely to be selected as the best beam of multiple beam antenna 120. A low path loss may indicate a stronger signal, resulting in more packets being received without requiring re-transmission.

Beam score function 601 may include a RSRQ input 645. RSRQ input 645 may be based on RSRQ field 545. A high RSRQ value may increase beam score 690. Providing an input based on the RSRQ value associated with a serving cell of a beam may be used to influence beam score 690 so that a beam that receives signals of a higher quality is more likely to be selected as the best beam of multiple beam antenna 120.

Beam score function 601 may include a serving cell RSRP/sum of detected cells RSRP input 650. Serving cell RSRP/sum of detected cells RSRP input 650 may be based on serving cell RSRP/sum of detected cells RSRP field 550. A high serving cell RSRP to sum of detected cells RSRP ratio may increase beam score 690. Providing an input based on a serving cell RSRP to sum of detected cells RSRP may be used to influence beam score 690 so that a beam associated with a high ratio is more likely to be selected as the best beam of multiple beam antenna 120. A high serving cell RSRP to sum of detected cells RSRP ratio may indicate that signals from the serving cell comprise a large portion of the signals received by the beam, indicating a more robust connection. A low ratio may indicate that the serving cell may not remain the preferred cell of the detected cells, which may result in more frequent switching of the serving cell.

Beam score function 601 may include a channel rank or CQI input 655. Channel rank or CQI input 655 may be based on channel rank and CQI field 555. A low channel rank value or a high CQI value may increase beam score 690. Providing an input based on the channel rank or CQI associated with a serving cell of a beam may be used to influence beam score 690 so that a beam that receives signals with a higher channel rank and/or channel quality is more likely to be selected as the best beam of multiple beam antenna 120. A low channel rank and/or a high channel quality may be associated with a higher throughput. For example, if channel rank is low, each transmitter of the serving cell may transmit a different bit stream on each channel. If channel rank is high, transmit diversity may need to be employed, meaning that the same bits are transmitted on multiple channels.

Beam score function 601 may include a throughput input 660. Throughput input 660 may be based on throughput field 560. A high throughput value may increase beam score 690. Providing an input based on the throughput associated with a serving cell of a beam may be used to influence beam score 690 so that a beam that receives signals with a higher throughput is more likely to be selected as the best beam of multiple beam antenna 120.

Beam score function 601 may include a transmit power input 665. Transmit power input 665 may be based on transmit power field 565. A high transmit power value may decrease beam score 690. Providing an input based on the transmit power associated with a beam may be used to influence beam score 690 so that a beam that sends signals with a lower transmit power is more likely to be selected as the best beam of multiple beam antenna 120. A lower transmit power may indicate less interference in the signal path between the beam and base station 130.

One or more of the inputs of beam score function 601 may be combined to generate beam score 690 for a particular antenna beam. In one implementation, inputs of beam score function 601 may be combined as a weighted sum. In other words, each of the inputs of beam score function 601 may be multiplied by a weight and the results may be added to generate beam score 690. For example, SINR input 610 may be given a greater weight than the other inputs, and thus beam score 690 may depend most significantly on SINR input 610.

A particular input of beam score function 601 may not significantly affect beam score 690 unless a value associated with the particular input is greater than, and/or less than, a particular threshold value. For example, SINR input 610 may not significantly affect beam score 690 unless the signal to noise ratio is below a particular threshold, at which point beam score 690 may decrease (e.g., decreasing the beam score of a beam if the beam receives signals with a signal to noise ratio below the threshold). Alternately or additionally, a particular input of beam score function 601 may affect beam score 690 in one particular way (e.g., linearly) above (or below) a particular threshold, and may affect beam score 690 in another way (e.g., exponentially) below (or above) the particular threshold.

Although FIG. 6 shows exemplary inputs of beam score function 601, in other implementations, beam score function 601 may contain fewer inputs, different inputs, or additional inputs, than depicted in FIG. 6. Additionally or alternatively, one or more inputs of beam score function 601 may include information described as being included in one or more other inputs of beam score function 601.

Figure 7:
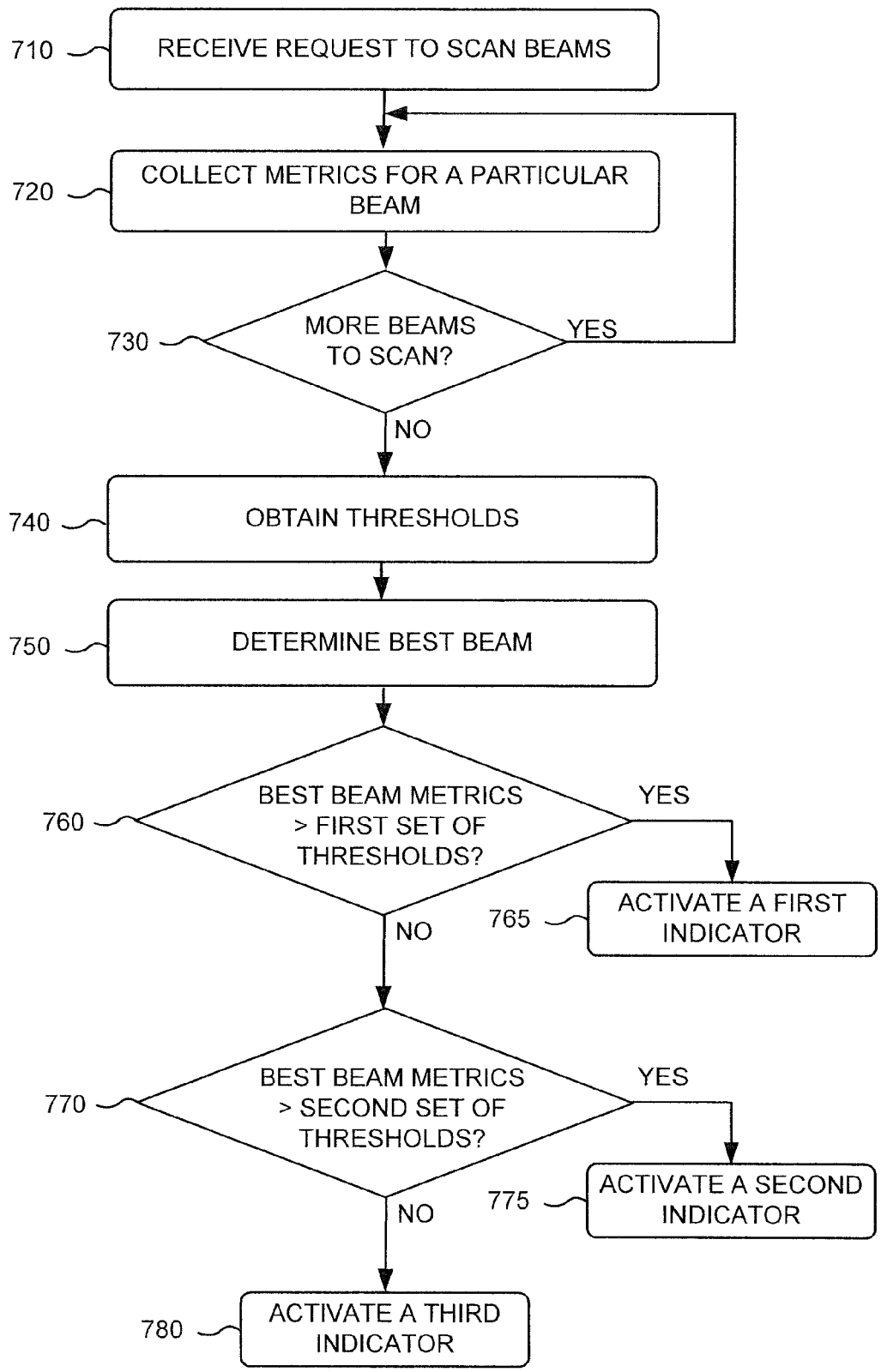
FIG. 7 is a flow diagram illustrating an example process for installing a CPE device according to an implementation described herein.

FIG. 7 is a flow diagram illustrating a process for installing a CPE device according to an implementation described herein. In one implementation, the process of FIG. 7 may be performed by antenna unit 120. In other implementations, some or all of the process of FIG. 7 may be performed by another device or a group of devices separate from or including antenna unit 120.

The process of FIG. 7 may include receiving a request to scan beams (block 710). For example, an operator attempting to find a good location for antenna unit 120 may use input device 340 to initiate a scan of the beam of multiple beam antenna 210. Metrics may be collected for a particular beam (block 720). For example, beam scanning component 410 may select beam 1 and request beam selection component 430 to select beam 1 and beam selection component 430 may control beam switching circuit 220 to select beam 1. Beam scanning component 410 may collect one or more metrics for beam 1 and store the collected metrics in antenna table 420.

A determination may be made as to whether there are more beams to scan (block 730). For example, beam scanning component 410 may keep track of which beams have been scanned and may determine whether additional beams need to be scanned. If it is determined that there are more beams to scan (block 730—YES), processing may return to block 720. If it is determined that there are no more beams to scan (block 730—NO), thresholds may be obtained (block 740). For example, threshold computing component 440 may obtain thresholds from threshold table 445.

In one implementation, thresholds may be preconfigured in threshold table 445 during manufacture (or programming) of beam switching controller 235 or may be downloaded by beam switching controller 235 from a device in provider network 140. In another implementation, threshold computing component 440 may compute thresholds from particular marketing requirements (e.g., a guaranteed throughput rate) and/or requirements associated with particular applications and/or services requested by a user of CPE device 110. The particular requirements may be stored in threshold table 445 and/or downloaded from a device in provider network 140. A best beam may be determined (block 750). For example, in one implementation, beam selection component 430 may calculate beam score 690 for each scanned beam based on one or more of the collected metrics, and may select the beam with the highest beam score. In another implementation, an operator may override the selection of the best beam and may manually select a best beam via operator interface 470.

A determination may be made whether best beam metrics are greater than a first set of thresholds (block 760). For example, indicator selection component 450 may compare the metrics of the best beam with thresholds stored in threshold table 445. In one implementation, only one threshold may be used (e.g., threshold for one of the collected metrics). In another implementation, multiple thresholds may be used. For example, indicator selection component 450 may compare the best beam metrics with a first set of thresholds {TG1, . . . TGN} that may be used to determine whether to activate a first indicator (e.g., a green LED).

If it is determined that best beam metrics are greater than the first set of thresholds (block 760—YES), a first indicator may be activated (block 765). For example, indicator selection component 450 may activate green LED 460-1.

If it is determined that the best beam metrics are not greater than the first set of thresholds (block 760—NO), a determination may be made whether best beam metrics are greater than a second set of thresholds (block 770). For example, indicator selection component 450 may compare the metrics of the best beam with thresholds stored in threshold table 445. In one implementation, only one threshold may be used (e.g., threshold for one of the collected metrics). In another implementation, multiple thresholds may be used. For example, indicator selection component 450 may compare the best beam metrics with a second set of thresholds {TY1, ... TYN} that may be used to determine whether to activate a second indicator (e.g., a yellow LED).

If it is determined that the best beam metrics are greater than the second set of thresholds (block 770—YES), a second indicator may be activated (block 775). For example, indicator selection component 450 may activate yellow LED 460-2. If it is determined that the best beam metrics are not greater than the second set of thresholds (block 770—NO), a third indicator may be activated (block 780). For example, indicator selection component 450 may activate red LED 460-3.

Figure 8A:
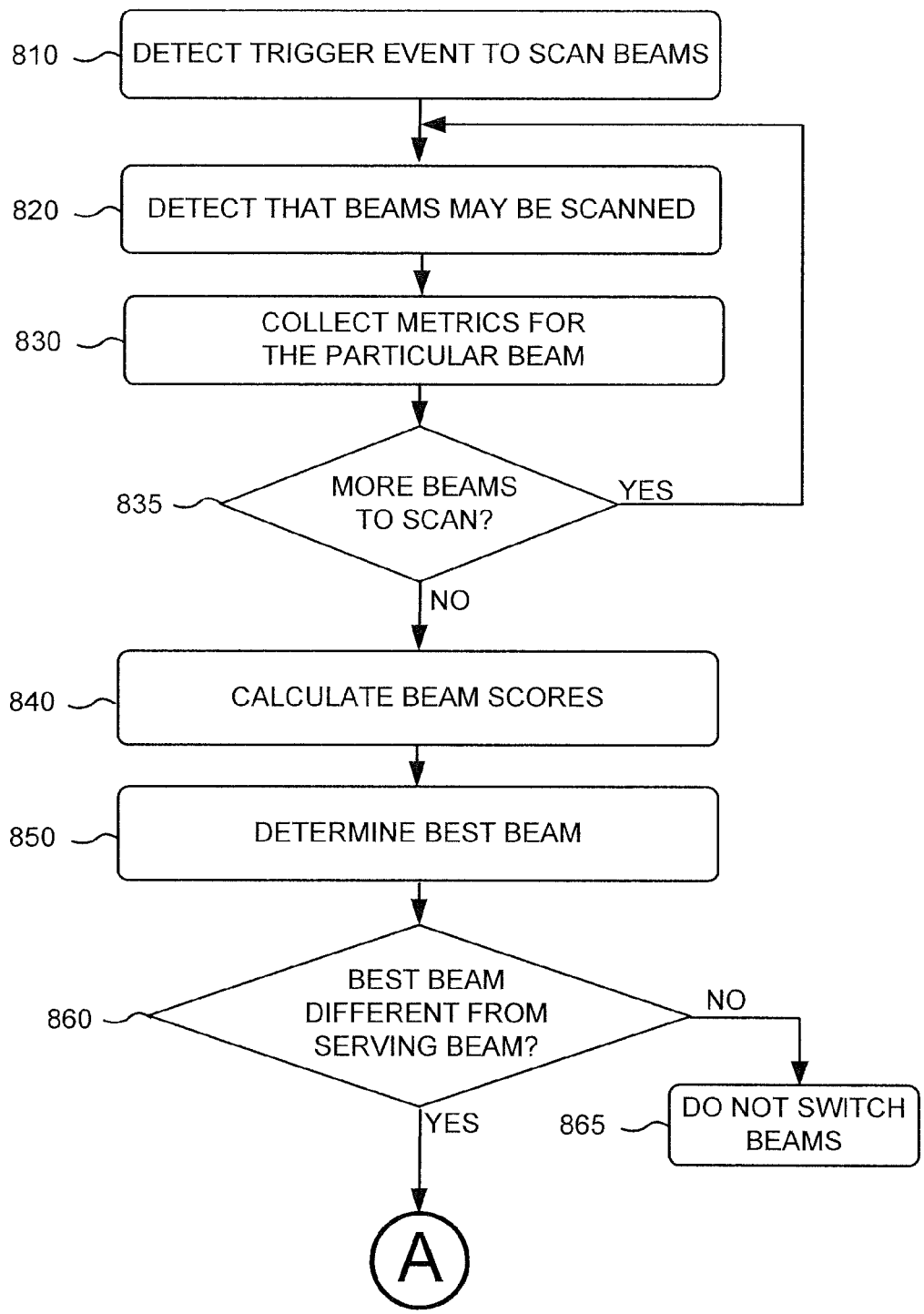
FIGS. 8A and 8B are flow diagrams illustrating an example process for selecting a best beam during operation according to an implementation described herein.
Figure 8B:
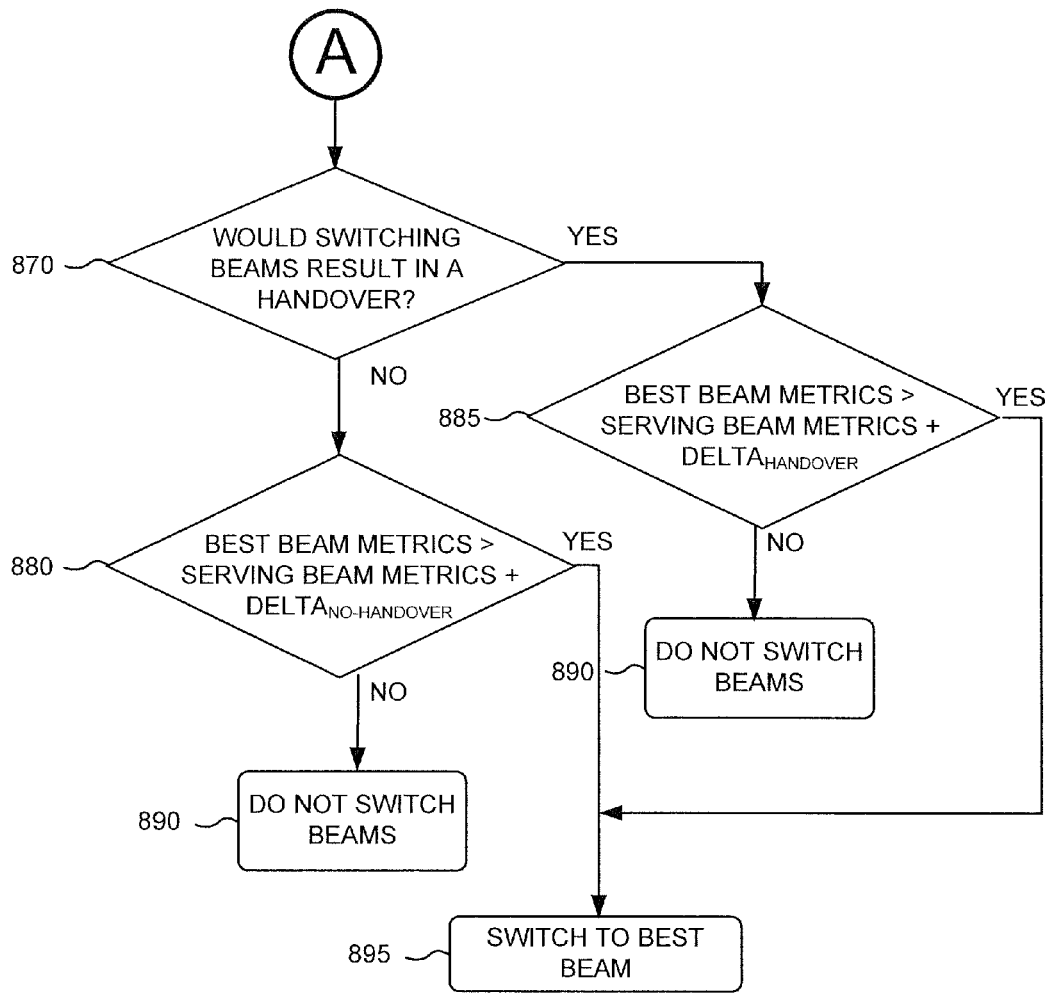

FIGS. 8A and 8B are flow diagrams illustrating a process for selecting a best beam during operation according to an implementation described herein. In one implementation, the process of FIGS. 8A and 8B may be performed by antenna unit 120. In other implementations, some or all of the process of FIGS. 8A and 8B may be performed by another device or a group of devices separate from or including antenna unit 120.

The process of FIGS. 8A and 8B may include detecting a trigger event to scan beams (block 810). A trigger event may correspond to detecting that a particular interval has elapsed. Beam scanning component 410 may scan beams of multiple beam antenna 210 at particular intervals. For example, scanning of beams may be scheduled at off-peak hours when signal traffic may be lighter than at other times (e.g., between 12 AM and 6 AM). A trigger event may correspond to detecting a particular condition of CPE device 110. The particular condition may include detecting that a particular metric associated with a serving beam is greater than (or less than) a trigger threshold. For example, beam scanning component 410 may detect that a SINR of the serving beam has dropped below a SINR trigger threshold. As another example, a trigger event may correspond to change in services provided to CPE device 110. For example, a user of CPE device 110 may upgrade to a subscription plan with a higher guaranteed throughput. A trigger event may correspond to a request from provider network 140, or from base station 130. For example, provider network 140, or base station 130, may need to collect metrics associated with beams of the multiple beam antenna 210 and may request beam scanning component 410 to scan the beams.

The process may also include detecting that beams may be scanned (block 820). For example, beam scanning component 410 may detect that multiple beam antenna 210 is not receiving or transmitting signals and that, therefore, scanning of beams may not interfere with the operation of CPE device 110. In a Radio Control Channel (RCC) idle mode, beam switching controller 235 may schedule beam scans in radio frames that do not coincide with paging frames. Beam switching controller 235 may initiate a scan, scan one or more beams, interrupt the scanning process to receive a paging frame, and resume the scan after the paging frame is received. For example, if a complete scan takes 300 millisecond (ms) and paging frames are received every 250 ms, beam switching controller 235 may scan beams 1-6, interrupt the scanning process to receive a paging frame, and, after the paging frame is received, may scan beams 7-8.

In RCC-connected mode, beam switching controller 235 may schedule beam scans in radio frames that do not coincide with times when CPE device 110 is scheduled to receive data on a data channel. Beam switching controller 235 may initiate a scan, scan one or more beams, interrupt the scanning process to monitor a paging channel, and resume the scanning process after completing the monitoring of the paging channel. Beam switching controller 235 may give preference to scanning beams while in RCC-idle mode to scanning beams while in RCC-connected mode.

Metrics for a particular beam may be collected (block 830). For example, beam scanning component 410 may select beam 1 and request beam selection component 430 to select beam 1 and beam selection component 430 may control beam switching circuit 220 to select beam 1. Beam scanning component 410 may collect one or more metrics for beam 1 and store the collected metrics in antenna table 420.

A determination may be made whether there are more beams to scan (block 835). For example, beam scanning component 410 may keep track of which beams have been scanned and may determine whether additional beams need to be scanned. If it is determined that there are more beams to scan (block 835—YES), processing may return to block 820. If it is determined that there are no more beams to scan (block 835—NO), in one implementation, beam scores may be calculated (block 840). For example, beam selection component 430 may calculate beam scores 690 for particular beams using beam score function 601. In another implementation, particular metrics may be compared individually without computing beam scores.

A best beam may be determined (block 850). For example, beam selection component 430 may calculate beam score 690 for each scanned beam based on one or more of the collected metrics, and may select the beam with the highest beam score.

A determination may be made whether the best beam is different from the serving beam (block 860). For example, beam selection component 430 may access current serving beam field 501 to determine the serving beam and determine whether the selected best beam is the current serving beam. If it is determined that the best beam is not different from the serving beam (block 860—NO), beams may not be switched (block 865). For example, beam switching component 430 may keep the serving beam as the selected beam.

If it is determined that the best beam is different from the serving beam (block 860—YES), a determination may be made whether switching beams would result in a handover (FIG. 8B, block 870). For example, beam switching component 430 may compare the serving cell field 515 of the serving beam with serving cell field 515 of the selected best beam to determine whether switching from the serving beam to the selected best beam would result in a handover (e.g., in switching base stations).

If it is determined that switching beams would result in a handover (block 870—YES), a determination may be made whether best beam metrics are greater than serving beam metrics plus a $delta_{handover}$ value (block 885). In one implementation, beam switching component 430 may compare beam score 690 associated with the best beam to the beam score 690 associated with the serving beam plus $delta_{handover}$. In another implementation, beam switching component 430 may compare a particular metric of the best beam with the particular metric of the serving beam plus a $delta_{handover}$ value associated with the particular metric, and may perform this comparison for one or more particular metrics. A $delta_{handover}$ value may represent a cost, in terms of device and/or network resources, of switching from a serving beam to a selected best beam, when the switch would result in a handover from one base station to another base station.

If it is determined that best beam metrics are greater than serving beam metrics plus a $delta_{handover}$ value (block 885—YES), a switch may be made to the best beam (block 895). For example, beam switching controller 235 may control beam switching circuit 220 to switch to the newly selected best beam. If it is determined that best beam metrics are not greater than serving beam metrics plus a delta (handover) value (block 885—NO), beams may not be switched (block 890). For example, beam switching controller 235 may keep the serving beam as the selected beam.

Returning to block 870, if it is determined that switching beams would not result in a handover (block 870—NO), a determination may be made whether best beam metrics are greater than serving beam metrics plus a $delta_{no\text{-}handover}$ value (block 880).

In one implementation, beam switching component 430 may compare beam score 690 associated with the best beam to the beam score 690 associated with the serving beam plus $delta_{no\text{-}handover}$. In another implementation, beam switching component 430 may compare a particular metric of the best beam with the particular metric of the serving beam plus a $delta_{no\text{-}handover}$ value associated with the particular metric, and may perform this comparison for one or more particular metrics. A $delta_{no\text{-}handover}$ value may represent a cost, in terms of device and/or network resources, of switching from a serving beam to a selected best beam, when the switch would not result in a handover from one base station to another base station.

If it is determined that best beam metrics are greater than serving beam metrics plus a $delta_{no\text{-}handover}$ value (block 880—YES), a switch may be made to the best beam (block 895). For example, beam switching controller 235 may control beam switching circuit 220 to switch to the newly selected best beam. If it is determined that best beam metrics are not greater than serving beam metrics plus a $delta_{no\text{-}handover}$ value (block 880—NO), beams may not be switched (block 890). For example, beam switching controller 235 may keep the serving beam as the selected beam.

Figure 9A:
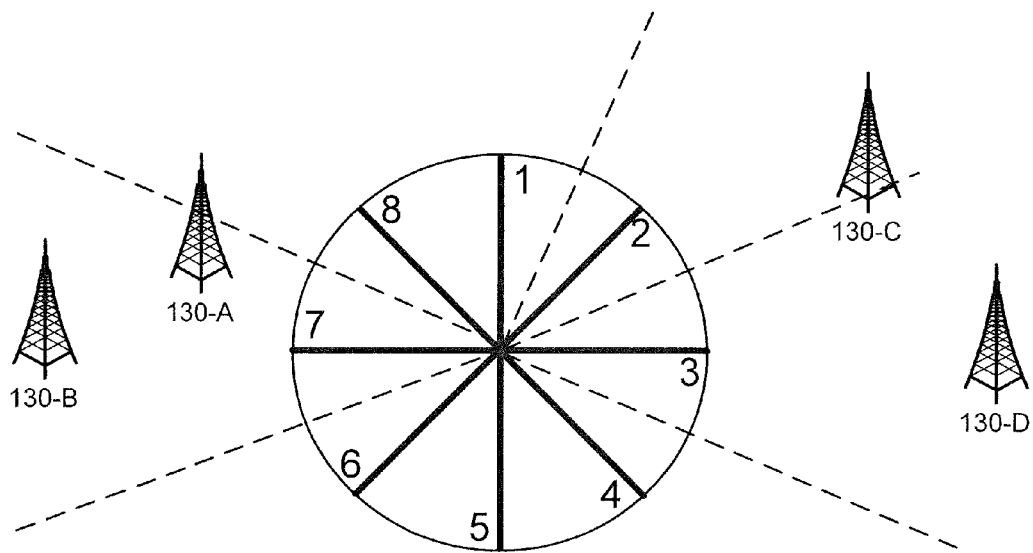
FIG. 9A is a diagram of an example base station configuration in relation to a CPE device with a multiple beam antenna.

FIG. 9A is a diagram of an example base station configuration in relation to a CPE device with a multiple beam antenna. Assume that multiple beam antenna 210 detects four base stations: base station 130-A, base station 130-B, base station 130-C, and base station 130-D. Assume that beam 7 detects signals from base station 130-A and base station 130-B, that beam 2 detects signals from base station 130-C, and that beam 3 detects signals from base station 130-C and base station 130-D.

Figure 9B:
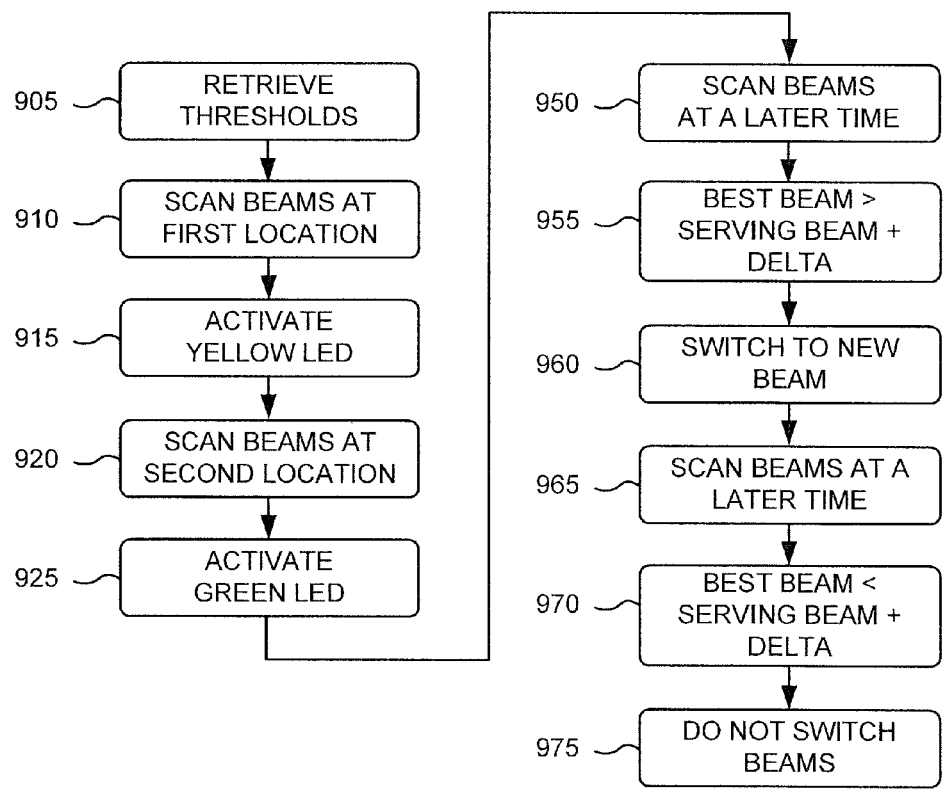
FIG. 9B is a flow diagram illustrating an example of a process for installing the CPE device of FIG. 9A and for selecting a best beam during the operation of the CPE device.

FIG. 9B is a flow diagram illustrating an example of a process for installing the CPE device of FIG. 9A and illustrating an example process for selecting a best beam during the operation of the CPE device of FIG. 9A. Assume that the metrics in the example process of FIG. 9B have been normalized to a scale of 0 to 1.

The process of FIG. 9B may include retrieving thresholds (block 905). For example, threshold table 445 may include a first set of thresholds that includes an RSRP threshold of −30 dBm, an RSRQ threshold of −40 dBm, and a channel rank threshold of 0.1, and a second set of thresholds that includes an RSRP threshold of −40 dBm, and RSRQ threshold of −0.50 dBm, and a channel rank threshold of 0.2. Thus, the thresholds {TG1, TG2, TG3} for green LED 460-1 may be set to {−30 dBm, −40 dBm, 0.1} and the set of thresholds {TY1, TY2, TY3} for yellow LED 460-2 may be set to {−40 dBm, −50 dBm, 0.2}.

The beams may be scanned at a first location (block 910). Beam 7 may be scanned for metrics of signals from base station 130-A, because base station 130-A may be closer to antenna unit 120 and may be associated with stronger signals. Beam 2 may be scanned for metrics of signals from base station 130-C, and beam 3 may be scanned for metrics from base station 130-C (which may be associated with stronger signals to beam 3 than base station 130-C).

Assume that the {RSRP, RSRQ, channel rank} metrics are measured as {−45 dBm, −50 dBm, 0.1} for beam 7, as {−35 dBm, −40 dBm, 0.1} for beam 2, and as {−40 dBm, −40 dBm, 0.09} for beam 3. Assume that, in this example, beam score function 601 only uses RSRP as input and that consequently the best beam is selected based on RSRP. Thus, beam 2 may be selected as the best beam and the metrics of beam 2 may be compared to the first set of thresholds and to the second set of thresholds.

The yellow LED may be activated (block 915), because the RSRP of beam 2 is less than TG1, but greater than TY1. The beams may be scanned at a second location (block 920). Beam 2 may be again selected as the best beam based on measured metrics of {−28 dBm, −40 dBm, 0.1}. The green LED may be activated (block 925), because the metrics of beam 2 satisfy thresholds {TG1, TG2, TG3}.

The beams may be scanned at a later time (block 950) and that the metrics associated with the beams may change. For example, assume a building has been erected between the path of signals from base station 130-C and beam 2, leading to a decrease in RSRP for beam 2. Assume that the metrics for beam 2 are measured as {−50 dBm, −60 dBm, 0.1} for beam 2, and that the metrics for beam 3 are measured as {−40 dBm, −40 dBm, 0.09}. Thus, beam 3 may be selected as the best beam.

A determination may be made that best beam metrics are greater than the serving beam metrics plus a $delta_{no\text{-}handover}$ value (block 955), because switching from beam 2 to beam 3 would not result in a handover, since both beam 2 and beam 3 are communicating with base station 130-C. Assume a $delta_{no\text{-}handover}$ value of 5 dBm, associated with RSRP. Thus, since RSRP of beam 3 is −40 dBm, which is greater than the RSRP of beam 2 plus the $delta_{no\text{-}handover}$ value (−50 dBm+5 dBm=−45 dBm), beam switching controller 235 may switch to a new beam (block 960), from beam 2 to beam 3.

The beams may be scanned at a later time (block 965) and that the metrics associated with the beams may change. For example, assume that a transformer at base station 130-B has been upgraded, resulting in base station 130-B transmitting at a higher power. Assume that the metrics for beam 7 are measured as {−35 dBm, −40 dBm, 0.1} and that the metrics for beam 3 are measured as {−40 dBm, −40 dBm, 0.09}. Thus, beam 3 may be selected as the best beam.

A determination may be made that best beam metrics are not greater than the serving beam metrics plus a $delta_{handover}$ value (block 970), because switching from beam 3 to beam 7 would result in a handover from base station 130-C to base station 130-B. Assume a $delta_{handover}$ value of 7 dBm, associated with RSRP. Thus, since RSRP of beam 7 is −35 dBm is not greater than the RSRP of beam 3 plus the $delta_{handover}$ value (−40 dBm+7 dBm=−33 dBm), beam switching controller 235 may not switch to beam 7 and may keep beam 3 as the serving beam (block 975).

The foregoing description of implementations provides illustration and description, but is not intended to be exhaustive or to limit the invention to the precise form disclosed. Modifications and variations are possible in light of the above teachings or may be acquired from practice of the invention.

For example, antenna unit 120 may include active components to minimize RF loses, improve link budgets, and/or provide additional capability to synthesize beams. Metrics may be collected for such synthesized beams and such synthesized beams may be selected in the beam selection process.

As another example, while series of blocks have been described with regard to FIGS. 7, 8A, 8B, and 9B, the order of the blocks may be modified in other implementations. Further, non-dependent blocks may be performed in parallel.

As another example, while FIG. 2 illustrates a multiple beam antenna, other implementations may include a distributed antenna that includes beams located in multiple locations. For example, a distributed antenna may include a first beam at one location of a roof (e.g., the north side of a building), and a second beam at another location of the roof (e.g., the south side of the building).

As yet another example, while an implementation described herein relates to selecting a beam of a multiple beam antenna for receiving and transmitting signals, in another implementation, a different beam may be selected for transmitting signals. Thus, a first beam may be selected for receiving signals based on a first set of metrics and a second beam may be selected for transmitting signals based on a second set of metrics.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by an antenna unit, the method comprising:
    scanning, by a processor of the antenna unit, beams of a multiple beam antenna, coupled to the antenna unit, to collect one or more metrics associated with the beams;
    selecting, by the processor, a best beam based on the collected one or more metrics or based on a manual selection received from an operator;
    retrieving, by the processor, one or more thresholds associated with the one or more metrics;
    comparing, by the processor, the collected one or more metrics, associated with the selected best beam, to the retrieved one or more thresholds; and
    determining, by the processor, whether the antenna unit is an acceptable location based on the comparison.

2. The method of claim 1, where the one or more metrics include one or more of:
    a signal to interference plus noise ratio (SINR) associated with a particular beam of the multiple beam antenna;
    a reference symbol received power (RSRP) associated with the particular beam;
    a path loss associated with the particular beam;
    a reference symbol received quality (RSRQ) associated with the particular beam;
    a ratio of a serving cell RSRP to a sum of detected cells RSRP associated with the particular beam;
    a throughput associated with the particular beam; or
    a transmit power associated with the particular beam.

3. The method of claim 1, where scanning the beams of the multiple beam antenna comprises:
    controlling a beam switching circuit to select a particular beam of the multiple beam antenna;
    receiving signals from a base station; and
    calculating the one or more metrics, associated with the particular beam, based on the received signals.

4. The method of claim 1, where comparing the collected one or more metrics, associated with the selected best beam, to the retrieved one or more thresholds comprises:
    comparing the collected one or more metrics to a first set of thresholds; and
    comparing the collected one or more metrics to a second set of thresholds.

5. The method of claim 4, further comprising:
    activating a first indicator when the collected one or more metrics satisfy the first set of thresholds;
    activating a second indicator when the collected one or more metrics do not satisfy the first set of thresholds and satisfy the second set of thresholds; and
    activating a third indicator when the collected one or more metrics do not satisfy the first set of thresholds and do not satisfy the second set of thresholds.

6. The method of claim 5, where the first indicator includes a green light emitting diode (LED), the second indicator includes a yellow LED, and the third indicator includes a red LED.

7. The method of claim 5, where the first indicator activates a first state of a display device, the second indicator activates a second state of the display device, and the third indicator activates a third state of the display device.

8. The method of claim 1, where the method is performed during installation of the antenna unit.

9. A method performed by an antenna unit, the method comprising:
    monitoring, by a processor of the antenna unit, particular information associated with a serving beam;
    determining, by the processor, if a value associated with the particular information is below a threshold;
    scanning, by the processor and when the value associated with the particular information is below the threshold, beams of a multiple beam antenna, coupled to the antenna unit, to collect one or more metrics associated with the beams;
    selecting, by the processor, a best beam based on the collected one or more metrics;
    comparing, by the processor, a set of metrics associated with the selected best beam with a corresponding set of metrics associated with the serving beam; and
    determining, by the processor, whether the antenna unit is an acceptable location based on the comparison.

10. The method of claim 9, where the one or more metrics include one or more of:
    a signal to interference plus noise ratio (SINR) associated with a particular beam of the multiple beam antenna;
    a reference symbol received power (RSRP) associated with the particular beam;
    a path loss associated with the particular beam;
    a reference symbol received quality (RSRQ) associated with the particular beam;

a ratio of a serving cell RSRP to a sum of detected cells RSRP associated with the particular beam;
a throughput associated with the particular beam; or
a transmit power associated with the particular beam.

11. The method of claim 9, further comprising:
detecting a trigger event to scan the beams; and
scanning the beams based on detecting the trigger event.

12. The method of claim 11, where detecting the trigger event includes at least one of:
detecting that a particular interval has elapsed;
detecting that a particular metric associated with the serving beam is greater than a threshold;
detecting a change in services provided to the device coupled to the antenna unit; or
receiving a request to scan the beams via a wireless signal.

13. The method of claim 9, further comprising:
scheduling the scanning such that scanning the beams will not interfere with operation of the device.

14. The method of claim 13, where scheduling the scanning comprises:
determining that the device is in an idle mode in relation to a radio control channel; and
scheduling the scanning for radio frames that do not coincide with paging frames associated with the idle mode.

15. The method of claim 13, where scheduling the scanning comprises:
determining that the device is in a connected mode in relation to a radio control channel; and
scheduling the scanning for radio frames that do not coincide with radio frames during which the device needs to monitor a paging channel.

16. The method of claim 9, further comprising:
determining whether to switch from the serving beam to the selected best beam based on the comparison, the determining whether to switch from the serving beam to the selected best beam including:
determining that switching from the serving beam to the selected best beam would result in a handover;
determining that one or more metrics, of the set of metrics associated with the selected best beam, are greater than a corresponding one or more metrics, of the set of metrics associated with the serving beam, plus a handover constant; and
switching from the serving beam to the selected best beam based on determining that one or more metrics, of the set of metrics associated with selected best beam, are greater than the corresponding one or more metrics, of the set of metrics associated with the serving beam, plus the handover constant.

17. The method of claim 9, further comprising:
determining whether to switch from the serving beam to the selected best beam based on the comparison, the determining whether to switch from the serving beam to the selected best beam including:
determining that switching from the serving beam to the selected best beam would not result in a handover;
determining that one or more metrics, of the set of metrics associated with the selected best beam, are greater than a corresponding one or more metrics, of the set of metrics associated with the serving beam, plus a no handover constant; and
switching from the serving beam to the selected best beam based on determining that one or more metrics, of the set of metrics associated with selected best beam, are greater than the corresponding one or more metrics, of the set of metrics associated with the serving beam, plus the no handover constant.

18. A device comprising:
a multiple beam antenna;
a switching circuit to select a particular beam of the multiple beam antenna; and
a beam switching controller to control the switching circuit to select the particular beam, the beam switching controller to:
monitor particular information associated with a serving beam;
determine if a value associated with the particular information is below a threshold;
scan, when the value associated with the particular information is below the threshold, beams of the multiple beam antenna to collect one or more metrics associated with the beams;
select a best beam based on the collected one or more metrics or based on a manual selection received from an operator;
compare a set of metrics associated with the selected best beam with a corresponding set of metrics associated with the serving beam; and
determine whether the antenna unit is an acceptable location based on the comparison.

19. The device of claim 18, where the beam switching controller further comprises:
an antenna table to store the collected one or more metrics, where the collected one or more metrics include one or more of:
a signal to interference plus noise ratio (SINR) associated with a particular beam of the multiple beam antenna;
a reference symbol received power (RSRP) associated with the particular beam;
a path loss associated with the particular beam;
a reference symbol received quality (RSRQ) associated with the particular beam;
a ratio of a serving cell RSRP to a sum of detected cells RSRP associated with the particular beam;
a throughput associated with the particular beam; or
a transmit power associated with the particular beam.

20. The device of claim 18, where the beam switching controller is further to:
detect a trigger event to scan the beams; and
scan the beams based on detecting the trigger event.

21. The device of claim 20, where the beam switching controller is to detect the trigger event based on at least one of:
detecting that a particular interval has elapsed;
detecting that a particular metric associated with the serving beam is greater than a threshold;
detecting a change in services provided to the device; or
receiving a request to scan the beams via a wireless signal.

22. The device of claim 18, where the beam switching controller is further to:
schedule the scanning such that scanning the beams will not interfere with operation of the device.

23. The device of claim 22, where the beam switching controller is further to:
determine that the device is in an idle mode in relation to a radio control channel; and
schedule the scanning for radio frames that do not coincide with paging frames associated with the idle mode.

24. The device of claim 22, where the beam switching controller is further to:
determine that the device is in a connected mode in relation to a radio control channel; and schedule the scanning for radio frames that do not coincide with radio frames during which the device needs to monitor a paging channel.

25. The device of claim 18, where the beam switching controller is further to:
   determine that switching from the serving beam to the selected best beam would result in a handover;
   determine that one or more metrics, of the set of metrics associated with the selected best beam, are greater than a corresponding one or more metrics, of the set of metrics associated with the serving beam, plus a handover constant; and
   switch from the serving beam to the selected best beam based on determining that one or more metrics, of the set of metrics associated with selected best beam, are greater than the corresponding one or more metrics, of the set of metrics associated with the serving beam, plus the handover constant.

26. The device of claim 18, where the beam switching controller is further to:
   determine that switching from the serving beam to the selected best beam would not result in a handover;
   determine that one or more metrics, of the set of metrics associated with selected best beam, are greater than a corresponding one or more metrics, of the set of metrics associated with the serving beam, plus a no handover constant; and
   switch from the serving beam to the selected best beam based on determining that one or more metrics, of the set of metrics associated with selected best beam, are greater than the corresponding one or more metrics, of the set of metrics associated with the serving beam, plus the no handover constant.

27. The device of claim 18, further comprising:
   an indicator, where the beam switching controller further comprises:
      an indicator selection component to:
         activate a first state of the indicator when the collected one or more metrics satisfy a first set of thresholds;
         activate a second state of the indicator when the collected one or more metrics do not satisfy the first set of thresholds and satisfy the second set of thresholds; and
         activate a third state of the indicator when the collected one or more metrics do not satisfy the first set of thresholds and do not satisfy the second set of thresholds.

28. One or more computer-readable memory devices storing instructions, the instructions comprising:
   one or more instructions which, when executed by a processor, cause the processor to scan beams of a multiple beam antenna to collect one or more metrics associated with the beams;
   one or more instructions which, when executed by the processor, cause the processor to select a best beam based on the collected one or more metrics;
   one or more instructions which, when executed by the processor, cause the processor to retrieve one or more thresholds associated with the one or more metrics;
   one or more instructions which, when executed by the processor, cause the processor to compare the collected one or more metrics, associated with the selected best beam, to the retrieved one or more thresholds; and
   one or more instructions which, when executed by the processor, cause the processor to determine whether the antenna unit is in an acceptable location based on the comparison.

29. One or more computer-readable memory devices storing instructions, the devices instructions comprising:
   one or more instructions which, when executed by a processor, cause the processor to monitor particular information associated with a serving beam;
   one or more instructions which, when executed by a processor, cause the processor to determine if a value associated with the particular information is below a threshold;
   one or more instructions which, when executed by the processor, cause the processor to scan, when the value associated with the particular information is below the threshold, beams of a multiple beam antenna, coupled to an antenna unit, to collect one or more metrics associated with the beams;
   one or more instructions which, when executed by the processor, cause the processor to select a best beam based on the collected one or more metrics;
   one or more instructions which, when executed by the processor, cause the processor to compare a set of metrics associated with the selected best beam with a corresponding set of metrics associated with the serving beam; and
   one or more instructions which, when executed by the processor, cause the processor to determine whether the antenna unit is an acceptable location based on the comparison.

* * * * *